United States Patent [19]

Odaka

[11] 4,438,464
[45] Mar. 20, 1984

[54] METHOD FOR EDITING OF PCM SIGNAL AND APPARATUS THEREOF

[75] Inventor: Kentaro Odaka, Tokyo, Japan

[73] Assignee: Sony Corporation, Tokyo, Japan

[21] Appl. No.: 324,139

[22] Filed: Nov. 23, 1981

[30] Foreign Application Priority Data

Jan. 25, 1980 [JP] Japan ................................ 55/165571

[51] Int. Cl.³ ..................... G11B 27/02; G11B 5/00
[52] U.S. Cl. ..................................... 360/13; 360/32
[58] Field of Search ........................... 360/13, 32, 39

[56] References Cited

U.S. PATENT DOCUMENTS 4,211,997  7/1980  Rudnick et al. .................. 360/13
4,375,083  2/1983  Maxemchuk ..................... 360/13

*Primary Examiner*—Vincent P. Canney
*Attorney, Agent, or Firm*—Lewis H. Eslinger; Alvin Sinderbrand

[57] ABSTRACT

A method for editing a PCM signal in which a first redundant code series is added to a PCM word series in a first arranging state (alignment) and a second redundant code series is added to the PCM word series and the first redundant code series in a second arranging state (alignment) after being interleaved. When desired data is intended to be edited from a master tape on which such PCM data as set forth was recorded, the first PCM data as well as the first and second redundant code series are supplied to a recording encoder so as to restrict an initial value of an interleaving circuit provided in the recording encoder to the same value as that already recorded. Also, an editing apparatus for implementing this process is described.

10 Claims, 14 Drawing Figures

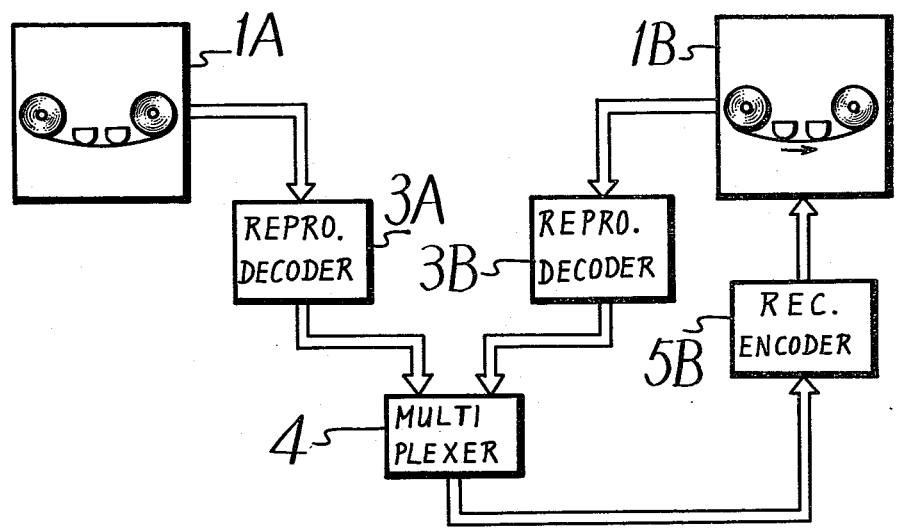
FIG. 1
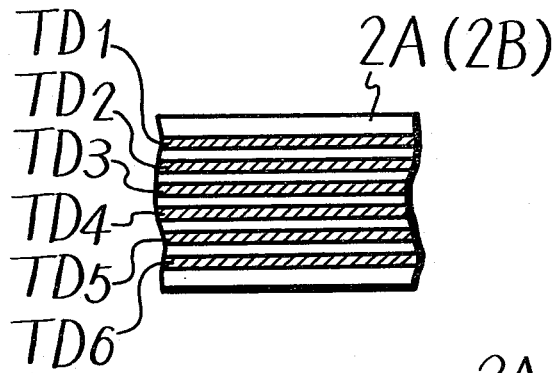
FIG. 2A
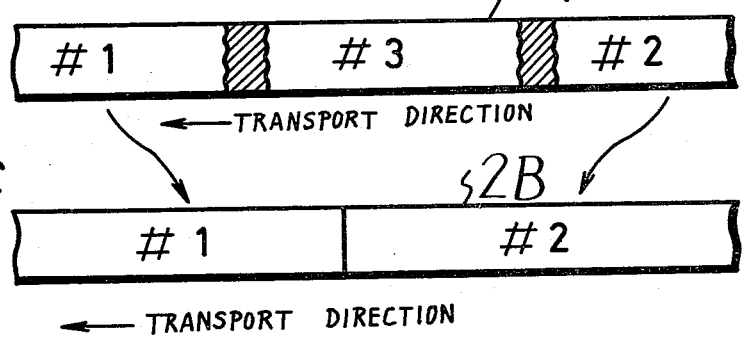
FIG. 2B
FIG. 2C

FIG. 5A

| Q(1) | X | X | X | Q5 | Q6 | Q7 | Q8 | Q9 | Q10 |
|---|---|---|---|---|---|---|---|---|---|
| P(0) |  |  |  | P4 | P5 | P6 | P7 | P8 | P9 |
| A(1) | A0 | A1 | A2 | A3 | A4 | A5 | A6 | A7 | A8 |
| B(1) |  | B0 | B1 | B2 | B3 | B4 | B5 | B6 | B7 |
| C(1) |  |  | C0 | C1 | C2 | C3 | C4 | C5 | C6 |
| D(1) |  |  |  | D0 | D1 | D2 | D3 | D4 | D5 |

|←D→|        $t_1$              $t \rightarrow$

FIG. 5B

| Q(0) | X | X | X | X | X | Q5 | Q6 |
|---|---|---|---|---|---|---|---|
| P(0) |  |  |  |  |  | P4 | P5 | P6 |
| A(0) | A0 | A1 | A2 | A3 | A4 | A5 | A6 |
| B(0) | B0 | B1 | B2 | B3 | B4 | B5 | B6 |
| C(0) | C0 | C1 | C2 | C3 | C4 | C5 | C6 |
| D(0) | D0 | D1 | D2 | D3 | D4 | D5 | D6 |

$t \rightarrow$

FIG. 5C

| A5 | A6 | A7 | A8 | A9 | A10 | A11 | A12 | E13 | E14 | E15 | E16 | E17 |
|---|---|---|---|---|---|---|---|---|---|---|---|---|
| B5 | B6 | B7 | B8 | B9 | B10 | B11 | B12 | F13 | F14 | F15 | F16 | F17 |
| C5 | C6 | C7 | C8 | C9 | C10 | C11 | C12 | G13 | G14 | G15 | G16 | G17 |
| D5 | D6 | D7 | D8 | D9 | D10 | D11 | D12 | H13 | H14 | H15 | H16 | H17 |

$t_2$        (#1)              $t_3$      (#2)      $t \rightarrow$

FIG. 5D

| Y | Y | Y | Q10 | Q11 | Q12 | Q13 | S14 | S15 | S16 | S17 | S18 |
|---|---|---|---|---|---|---|---|---|---|---|---|
|  |  |  | P9 | P10 | P11 | P12 | R13 | R14 | R15 | R16 | R17 |
| A5 | A6 | A7 | A8 | A9 | A10 | A11 | A12 | E13 | E14 | E15 | E16 |
|  | B5 | B6 | B7 | B8 | B9 | B10 | B11 | B12 | F13 | F14 | F15 |
|  |  | C5 | C6 | C7 | C8 | C9 | C10 | C11 | C12 | G13 | G14 |
|  | D5 | D6 | D7 | D8 | D9 | D10 | D11 | D12 | H13 |

$t_4$                              $t \rightarrow$

| | ←TRANSPORT DIRECTION | | PB → | T3 | REC → | | | 2B |
|---|---|---|---|---|---|---|---|---|
| TD1 | Q10 | Q11 | Q12 | Q13 | S14' | S15' | S16' | S17' | S18' |
| TD2 | P9 | P10 | P11 | P12 | R13' | R14' | R15' | R16' | R17' |
| TD3 | A8 | A9 | A10 | A11 | A12 | E13 | E14 | E15 | E16 |
| TD4 | B7 | B8 | B9 | B10 | B11 | B12 | F13 | F14 | F15 |
| TD5 | C6 | C7 | C8 | C9 | C10 | C11 | C12 | G13 | G14 |
| TD6 | D5 | D6 | D7 | D8 | D9 | D10 | D11 | D12 | H13 |

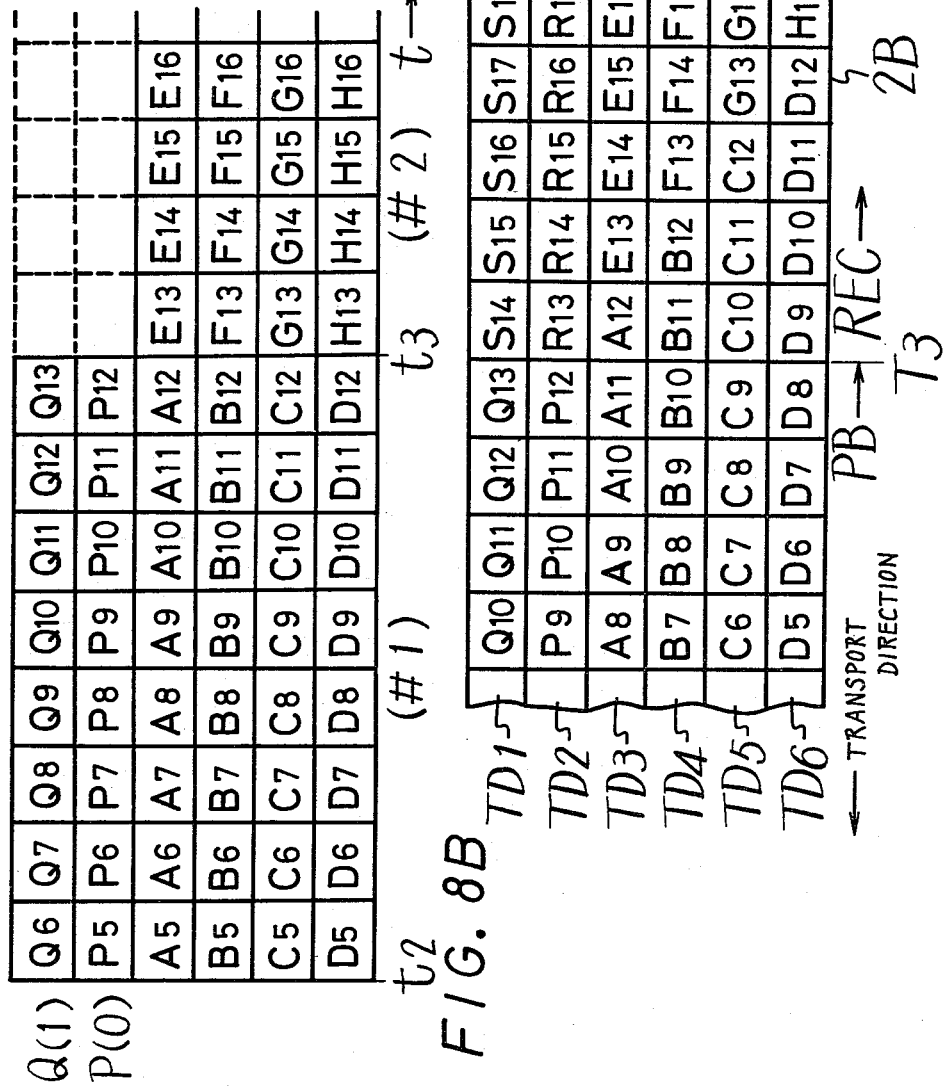

METHOD FOR EDITING OF PCM SIGNAL AND APPARATUS THEREOF

BACKGROUND OF THE INVENTION

1. Field of the Invention

This invention relates to a method for editing a PCM (pulse code modulated) signal and an apparatus for implementing this method for a case in which a feedback cross-interleaving is employed so as to record and reproduce PCM data such as an audio PCM signal.

2. Description of the Prior Art

It is well known in the art to edit an audio PCM signal series by separating the series at a predetermined number of words, adding a redundant code series for error correction, interleaving the series so as to apply different delays to the PCM data and the error correcting code series and further adding a second error detecting code.

For one of such known interleaving methods, a cross-interleaving method has been proposed in that a first redundant code is added to a PCM word series of a predetermined number of words in a first arranging mode (alignment) and a second redundant code is added to the interleaved PCM word series and first redundant code in a second arranging mode (alignment). The cross-interleaving can greatly improve the error correcting capability as compared with a simple interleaving since each word of the PCM data is included in the two series to generate the first and second redundant codes. The feedback cross-interleaving is provided to feed the second redundant code back to the first arranging mode so as to include the second redundant code in the series which generates the first redundant code and therefore, the error correcting capability is further improved.

Also, it is well known that a desired PCM signal series may be reproduced from a plurality of recording media, for example, magnetic tapes on which independent PCM signal series are recorded so as to be sequentially edited into a PCM signal series of a predetermined order. This editing procedure is performed as follows. A first desired PCM signal series is reproduced from a master tape and recorded on a slave tape or the like by a recording/reproducing apparatus. Next, the recorded PCM signal is reproduced from the slave tape and at the end portion of the first PCM signal series, a second desired PCM series reproduced from the master tape is recorded on the slave tape as the second PCM signal series by switching the recording/reproducing apparatus as described above to the recording mode. By this procedure, the desired first and second PCM signal series can be recorded on the slave tape. However, when a PCM signal series already processed by feedback cross-interleaving was reproduced for editing, it was quite difficult to perform the error correction correctly.

OBJECTS AND SUMMARY OF THE INVENTION

An object of this invention is to provide a method for editing a PCM signal series and an apparatus for implementing this method to correctly connect data recorded with an error correction method utilizing cross-interleaving to other data recorded with a similar error correction method.

Another object of this invention is to provide a method for editing a PCM signal series and an apparatus for implementing this method which can correctly perform the error correction in which data reproduced from a recording medium is supplied to a reproducing decoder, which generates a redundant code series for error correction in addition to reproducing the PCM data whereby an initial value of a delay circuit of a feedback loop in a recording encoder is restricted to the same value as that originally recorded on the recording medium in this redundant code so as to enable the switching over from an input data to a data to be connected therewith.

According to an aspect of the present invention, there is provided a method for editing a PCM signal series including the steps of forming a first redundant code series from a plurality of PCM data series in a first arranging state (alignment), delaying the plurality of PCM data series and the first redundant code by different times from each other thereby to place them in a second arranging state (alignment) and forming the second redundant code series from the plurality of PCM data series in the second arranging state and the first redundant code series, reproducing a first interleaved data so that the second redundant code series is delayed and fed back to the first arranging state from a recording medium, supplying the first data to a reproducing decoder including a deinterleaving circuit and an error correcting circuit and obtaining first PCM data, connecting the first PCM data to a second PCM data and supplying the connected data to a recording encoder including an interleaving circuit and a first and second redundant code generating circuit and restricting an initial value of the interleaving circuit in the recording encoder to a value equal to that recorded by supplying the first PCM data as well as the first and second redundant code series relating to the first PCM data from the reproducing decoder to the recording encoder when an output of the recording encoder is recorded on the recording medium.

Also, according to another aspect of the present invention, there is provided a PCM signal editing apparatus including a reproducing apparatus for reproducing first and second redundant codes and first interleaved PCM data which includes a plurality of PCM data series, a first reproducing decoder included in the reproducing apparatus and including deinterleaving and error-correcting circuits, a recording/reproducing apparatus for recording an output of the reproducing decoder through a recording encoder, a second reproducing decoder including deinterleaving and error-correcting circuits and to which the first PCM data is supplied when the recording/reproducing apparatus is switched to a reproducing mode, and a multiplexer supplied with outputs from the first and second reproducing decoders and supplying second PCM data reproduced from the reproducing apparatus subsequent to the first PCM data from the recording/reproducing apparatus to the recording encoder to be recorded when the first PCM data from the recording/reproducing apparatus is ended, the recording encoder comprising a first means for delaying the first redundant code series and the PCM data series by a predetermined time from the second redundant code series, a second means for delaying the plurality of PCM data series with a different predetermined time from each other, a third means to be supplied with the output of the first means when the second PCM data is supplied, a fourth means to be supplied with the output of the second means, a fifth means for selecting the output of the fourth means and delaying it by a predetermined time so as to supply it to the third means, and a sixth means for selecting the output of the third means and supplying it to the fourth means.

The other objects, features and advantages of the present invention will become apparent from the following description taken in conjunction with the accompanying drawings, throughout which the like references designate the same elements and parts.

BRIEF DESCRIPTION OF THE DRAWINGS

FIG. 1 is a block diagram showing an outlined arrangement of a PCM signal editing system according to the present invention;

FIGS. 2A, 2B and 2C are schematic diagrams utilized for explaining a recording pattern and editing processes of a PCM signal recording/reproducing apparatus according to the present invention;

FIGS. 5A, 5B, 5C and 5D are schematic diagrams each showing a data arrangement utilized for explaining operations of the encoder and the decoder;

FIGS. 8A and 8B are each schematic diagrams of a data arrangement utilized for explaining one embodiment of this invention.

DESCRIPTION OF THE PREFERRED EMBODIMENT

Figure 3:
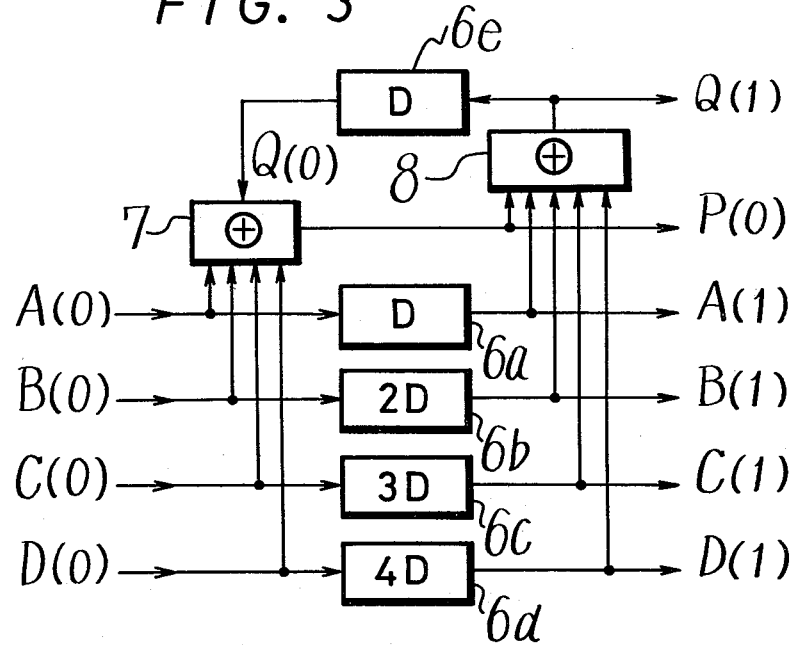
FIG. 3 is a block diagram showing one example of a recording encoder.

FIG. 1 shows an outline of an editing system for PCM signals and, in the figure, reference numerals 1A and 1B respectively denote PCM recording/reproducing apparatus of fixed head systems. These PCM recording/reproducing apparatus 1A and 1B are provided to form, as illustrated in FIG. 2A, data tracks $TD_1$ to $TD_6$, each of which is formed in parallel to each other in longitudinal directions of magnetic tapes 2A and 2B. Recorded on data track $TD_1$ is a second redundant code such as second parity data, while recorded on the data track $TD_2$ is a first redundant code, for example, first parity data and recorded on other data tracks $TD_3$ to $TD_6$ each are PCM data corresponding to one channel.

When a master tape 2A, on which data having programs (or takes), numbered #1, #3, #2, . . . as illustrated in FIG. 2B is recorded, is reproduced by the PCM recording/reproducing apparatus 1A and an electronic editing is carried out in order to create the editing tape 2B, in which as illustrated in FIG. 2C, for example, the program #1 is connected with the program #2, the data of the program #1 is first recorded on the editing tape 2B for a slightly longer time than required in practice and then this editing tape 2B and the master tape 2A are reproduced so as to record the program #2 from a cut-in point by the PCM recording/reproducing apparatus 1B. The PCM recording/reproducing apparatus is provided with a recording head and a reproducing head disposed at a position preceding thereto.

Referring back to FIG. 1, a reproduced output of the PCM recording/reproducing apparatus 1A is supplied through a reproducing decoder 3A to a multiplexer 4 and a reproduced output from the preceding reproducing head of the PCM recording/reproducing apparatus 1B is supplied through a reproducing decoder 3B also to the multiplexer 4 whereby an output of the multiplexer 4 is applied through a recording encoder 5B to the PCM recording/reproducing apparatus 1B so as to be recorded on the editing tape 2B. The reproducing decoders 3A and 3B are provided with memories permitting a deinterleaving delay to be supplied to a data series, and error correcting decoders each employing the first and second parity data, while the recording encoder 5B is provided with a memory to permit an interleaving delay to be supplied to a data series and a circuit to generate the first and second parity data.

Figure 4:
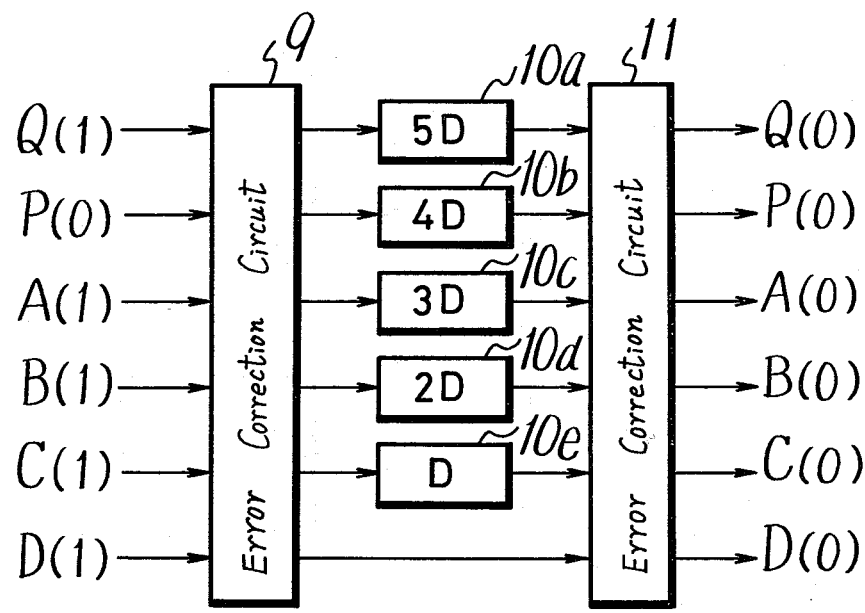
FIG. 4 is a block diagram showing one example of a reproducing decoder.

FIG. 3 illustrates one example of an arrangement of the recording encoder 5B and FIG. 4 an example of an arrangement of the reproducing decoders 3A and 3B.

The recording encoder 5B is comprised of delay circuits 6a, 6b, 6c and 6d to permit delays of D, 2D, 3D and 4D to be supplied to PCM data series $A_{(0)}$, $B_{(0)}$, $C_{(0)}$ and $D_{(0)}$ of four channels. A delay circuit 6e use provided in a feedback loop of a parity data series $Q_{(1)}$ to permit a delay of D to be applied thereto. A parity generating circuit 7 is provided form a parity data series $P_{(0)}$ from the PCM data series in a first arranging state at the input side and the parity data series $Q_{(0)}$ fed back, and a parity generating circuit 8 is provided to form a parity data series $Q_{(1)}$ from the PCM data series $A_{(1)}$, $B_{(1)}$, $C_{(1)}$ and $D_{(1)}$, each in a second arranging state at the output side after being delayed, and the parity data series $P_{(0)}$. These data series are respectively recorded as the tracks $TD_1$ to $TD_6$ on the magnetic tapes 2B. Letter D designates an unit delay amount and there is employed in practice a memory or RAM (Random Access Memory) in which write and read addresses thereof are adapted to be controlled so as to give a predetermined amount of delay.

Further, the reproducing decoders 3A and 3B each are provided with an error correcting circuit 9 to correct errors by a method employing each word of the data series in the second arranging state which are reproduced from each data track on the magnetic tapes 2A and 2B, deinterleaving circuits 10a, 10b, 10c, 10d and 10e to permit delay amounts of 5D, 4D, 3D, 2D, D and 0 to be supplied to the output series from the error correcting circuit 9 and an error correcting circuit 11 to correct errors by a method utilizing each word of the data series converted to the first arranging state by the deinterleaving. It is more effective to carry out the error corrections in accordance with respective arranging states a plurality of times so that the error correcting circuit, though not shown, may be provided in a next stage of the error correcting circuit 11 through a delay circuit group in order to convert the data series to the first arranging state. Like the recording encorder 5B, the deinterleaving operations of the reproducing decoders 3A and 3B are performed by the address control in the memory.

The reproducing decorders 3A and 3B are provided with error concealing circuits to conceal an erroneous word which can not be error-corrected. Although the description of the aforesaid PCM editing system, PCM recording/reproducing apparatus and error correction method each has been quite simplified for the benefit of brevity, it may also be possible to use a fixed head type apparatus to divide one channel into multitracks for recording, as well as a rotary head type apparatus in which the PCM signal is converted to the same signal format as a television signal thereby recorded and reproduced by a VTR (Video Tape Recorder) of a rotary head type. Other codes having higher error correcting capability than the parity word code may be employed as the error correcting codes and other modifications such as adding an error correcting CRC (Cyclic Redundancy Check) code (a kind of cyclic code) to each block composed of four words and two parity words.

Since the feedback cross interleaving of the feedback type as depicted above supplys the parity data series $Q_{(0)}$ obtained at the output of the delay circuit 6e in the feedback loop to the parity generating circuit 7 so as to produce the parity data series $P_{(0)}$, the parity data series $P_{(0)}$ and $Q_{(1)}$ to be generated in the latter are influenced by an initial value of the delay circuit 6e. By way of example, a description will be given for encoding in which D=one word. As seen in FIG. 5A, a proper initial value represented by X is previously set in the delay circuit 6e and, until a word $D_0$ as the output series $D_{(1)}$ is produced, the recording encoder 5B is operated so as to repeatedly generate this initial value X from the delay circuit 6e. In the one word period from a time $t_1$ in which the word $D_0$ is generated from the delay circuit 6d, the calculation of $P_4 = X \oplus A_4 \oplus B_4 \oplus C_4 \oplus D_4$ is performed in the parity generating circuit 7 and the operation of $Q_5 = P_4 \oplus A_3 \oplus B_2 \oplus C_1 \oplus D_0$ is performed in the parity generating circuit 8 and the parity generating operations are sequentially carried out thereafter. Accordingly, respective parity words of the parity data series $Q_{(1)}$ and $P_{(0)}$ outputted from the recording encoder 5B are all influenced by the initial value X.

When the output of recording encoder 5B is supplied to the reproducing decoders 3A and 3B (refer to FIG. 4), blocks followed by the block of $Q_5$, $P_4$, $A_3$, $B_2$, $C_1$ and $D_0$ are error-corrected in the error correcting circuit 9 and the preceding PCM data are outputted unchanged. The data series deinterleaved in the delay circuits 10a to 10e have the contents as illustrated in FIG. 5B in which blocks followed by the block of X, $P_4$, $A_4$, $B_4$, $C_4$ and $D_4$ are error-corrected in the error correcting circuit 11 and the previous PCM data are outputted unchanged.

In the PCM editing system as shown in FIG. 1, a description will now be given to a case wherein the program #1 (PCM data series $A_{(0)}$, $B_{(0)}$, $C_{(0)}$ and $D_{(0)}$) reproduced by the preceding reproducing head of the PCM recording/reproducing apparatus 1B and delivered from the reproducing decoder 3B is connected with the program #2 (PCM data series $E_{(0)}$, $F_{(0)}$, $G_{(0)}$ and $H_{(0)}$) reproduced from the PCM recording/reproducing apparatus 1A and generated from the reproducing decoder 3A by the multiplexer 4, encoded by the recording encoder 5B and then recorded. As seen in FIG. 5C, if the multiplexer 4 produces the PCM data of the program #1 as the PCM data of $A_5$, $B_5$, $C_5$ and $D_5$ at a time $t_2$ and the data are switched over at a time $t_3$ to which the PCM data of the program #2 starting from a block of $E_{13}$, $F_{13}$, $G_{13}$ and $H_{13}$ are connected, output data series of the recording encoder 5B becomes the ones as illustrated in FIG. 5D. In other words, if an initial value Y exists in the delay circuit 6e of the recording encoder 5B, two parity words are started to be generated from a time $t_4$ at in which the PCM word $D_5$ appears in the output of the delay circuit 6d and in a first one word period beginning from the time $t_4$, calculations of $P_9' = Y \oplus A_9 \oplus B_9 \oplus C_9 \oplus D_9$ and $Q_{10}' = P_9' \oplus A_8 \oplus B_7 \oplus C_6 \oplus D_5$ are carried out. Also, in a one word period where the PCM data of the program #2 are inputted, calculation of $R_{13}' = Q_{13}' \oplus E_{13} \oplus F_{13} \oplus G_{13} \oplus H_{13}$ is performed. Accordingly, all parity data series obtained from the recording encoder 5B are influenced by the initial value Y.

Figures 6, 7:
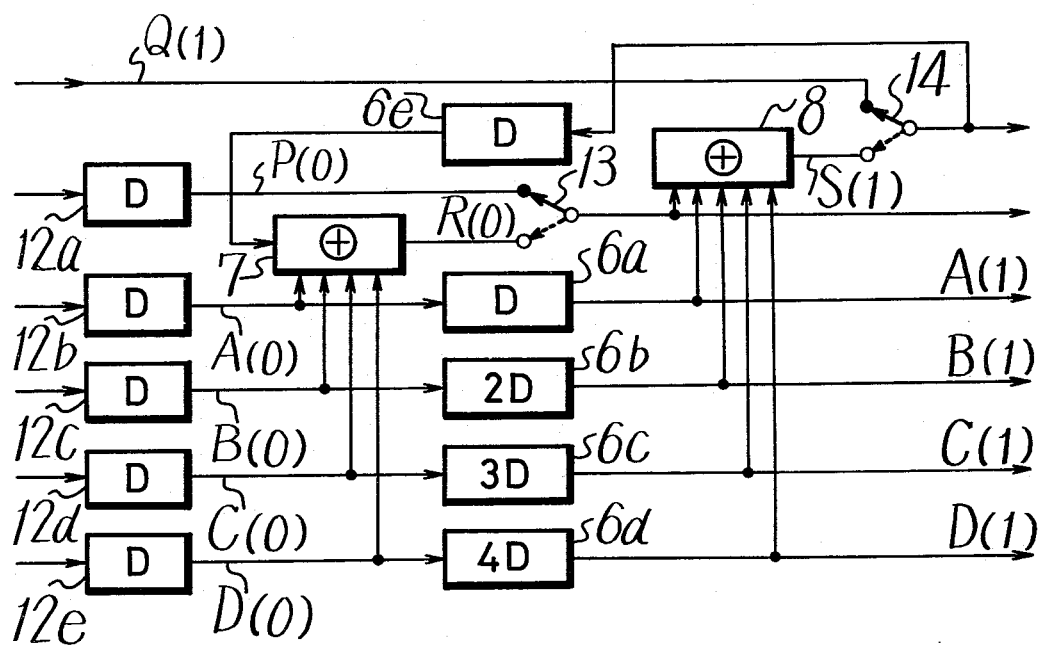
FIG. 6 is a schematic diagram showing an arrangement of recorded data on a magnetic tape when data are simply connected with one another.
FIG. 7 is a block diagram showing one embodiment of the recording encoder according to the present invention is applied.

Consequently, as illustrated in FIG. 6, it is no problem to rewrite the data from a position $T_3$ of the magnetic tape 2B utilizing the PCM recording/reproducing apparatus 1B, but there is a problem in that that the parity data series can not be correctly connected. That is, since the parity word $Q_{13}$ originally recorded and positioned prior to the position $T_3$ has a different initial value and is different from the parity word $Q_{13}'$ generated in the recording encoder 5B, when the magnetic tape 2B thus recorded is reproduced and deinterleaved, the data of $Q_{13}$, $R_{13}'$, $E_{13}$, $F_{13}$, $G_{13}$ and $H_{13}$ are be supplied to error correcting circuit 11, so that the error correction cannot be performed correctly. Erroneous error correction may possibly be performed. This problem will occur throughout the interval of D.

This problem may be solved in a manner wherein the data of the program #1 recorded on the magnetic tape 2B is reproduced from the beginning so as to be connected to the data of the program #2 and at that time, the initial value of the recording encoder 5B will be selected as the X. Such an editing method as set forth has extremely poor efficiency and hence is not suitable for a practical use. Due to the problem thus discussed, feedback cross interleaving has been regarded as ineffective for editing.

This invention is embodied in an editing method in which this problem avoided.

A description will hereinafter be given to one embodiment wherein the method of this invention is applied to a PCM editing system as mentioned before. FIG. 7 shows one example of an embodiment of the recording encoder for this case. Since the reproducing decoders 3A and 3B as illustrated in FIG. 4 produce the PCM data series $A_{(0)}$ to $D_{(0)}$, the parity data series $Q_{(0)}$ and $P_{(0)}$, the arranging relationships of which are shown in FIG. 5B, there are provided delay circuits 12a to 12e which delay all other data series except for the parity data series $Q_{(0)}$ equally by D so as to form a parity data series $Q_{(1)}$ placed ahead of the parity data series $P_{(0)}$ relatively by D. There are also provided switches 13 and 14 to change over the parity data series at a time later only by D than a time at which the multiplexer 4 switches the PCM data. The switch 13 is adapted to be switched so as to select either of the parity data series $P_{(0)}$ generated from the reproducing decoder 3B and produced in the output of the delay circuit 12a and the parity data series $R_{(0)}$ formed in the parity generating circuit 7. The switch 14 is adapted to be changed over so as to select either of the parity data series $Q_{(1)}$ supplied from the reproducing decoder 3B and the parity data series $S_{(1)}$ formed in the parity generating circuit 8. Outputs of these switches 13 and 14 are employed as an output data series of the recording encoder 5B and the output of the switch 14 is supplied through the feedback delay circuit 6e to the parity generating circuit 7.

By way of example, if D=one word is established and blocks of $A_{12}$, $B_{12}$, $C_{12}$ and $D_{12}$ within the data of the program #1 are to be connected to the data of the program #2 after blocks of $E_{13}$, $F_{13}$, $G_{13}$ and $H_{13}$, the data arranging relationship between the outputs of the delay circuits 12a and 12e, i.e., the inputs of the recording encoder 5B, is switched, as shown in FIG. 8A, to a state (shown by a broken line in FIG. 8A) in which the PCM data series of the program #2 appears from the time denoted by $t_3$ and the switches 13 and 14 respectively select either of the parity data series $R_{(0)}$ and $S_{(1)}$ generated in the parity generating circuits 7 and 8. In the one word interval prior to the time $t_3$, as seen in FIG. 8A, parity words $Q_{13}$ and $P_{12}$ and PCM words of $A_{11}$, $B_{10}$, $C_9$ and $D_8$ are produced at an output end of the recording encoder 5B as the outputs thereof. Also, in the one word interval after the time $t_3$ respective calculations of $R_{13}=Q_{13} \oplus E_{13} \oplus F_{13} \oplus G_{13} \oplus H_{13}$ and $S_{14}=R_{13} \oplus A_{12} \oplus B_{11} \oplus C_{10} \oplus D_9$ are performed in the parity generating circuits 7 and 8 thereby to generate the parity words $R_{13}$ and $S_{14}$. Likewise, parity words are sequentially formed in the parity generating circuits 7 and 8 thereafter.

When respective data series produced in the output of the recording encoder 5B as set forth are recorded on the magnetic tape 2B as the data tracks $TD_1$ to $TD_6$, as illustrated in FIG. 8B, the same data as the original data are recorded thereon in the positions up to the position $T_3$, and thereafter the outputs of the recording encoder 5B are recorded thereon. When the magnetic tape 2B thus edited is reproduced and the reproduced output is supplied to the reproducing decoder 3B, the blocks of $Q_{13}$, $R_{13}$, $E_{13}$, $F_{13}$, $G_{13}$ and $H_{13}$ already deinterleaved are applied to the error correcting circuit 11 so that the correct error correction can be performed.

As described above, according to this invention, when data is connected to the middle of other data already recorded on the magnetic tape and recorded, since the redundant code initially recorded is also supplied to the recording encoder 5B so as to specify the initial state of the delay circuits in the feedback loop in the recording encoder 5B to be in a relationship similar to the recorded data, it is possible to maintain a correct interleaving relationship between the data originally recorded and the data newly recorded. The PCM data and the redundant code originally recorded are available so that those which are at least D or more prior to the time $t_3$ are employed when switching the PCM data. In addition, it is preferable to select the editing point so that these PCM data and redundant code are not uncorrectable by the presence of a dropout and so on.

In the embodiment of this invention as described above, two parity data series from the reproducing decoder 3B are supplied together to the recording encoder 5B, but it may also be possible that only one parity data series $Q_{(1)}$ is supplied thereto and the other parity data series $P_{(0)}$ is formed in the parity generating circuit 7. Further, each of the delay circuits and the switches 13 and 14 of arrangements as illustrated in FIG. 7 can be realized by controlling the write-in and read-out addresses of the memory (RAM).

What is claimed is:

1. Apparatus for editing PCM signals by reproducing a plurality of first data sections from a first recording medium and recording a plurality of second data sections on a second recording medium, each of said first and second data sections including a respective plurality of data series and respective first and second error code series, said apparatus comprising:
reproducing means for reproducing one of said first data sections from said first recording medium;
first decoder means for receiving said reproduced first data section and for producing a respective plurality of data series and first and second error code series ordered in a first alignment as a first output;
recording/reproducing means for recording on and reproducing from said second recording medium a second data section composed of a respective plurality of data series and first and second error code series ordered in a second alignment;
second decoder means for receiving said reproduced second data section, for reordering its respective plurality of data series and first and second error code series from said second alignment into said first alignment, and for producing the same as a second output;
multiplexer means for selectively outputting a selected one of said first and second outputs as a third output including received first and second error code series; and
encoding means for receiving said third output, for generating generated first and second error code series, for reordering said plurality of data series and selected first and second error code series into said second alignment and for recording the same onto said second recording medium, said encoding means including
first delay means for delaying once said plurality of data series and said received first error code series by a first predetermined period from said received second error code series;
second delay means for delaying twice said once delayed plurality of data series with respect to each other by a plurality of second different predetermined periods;
first error code generation means for generating a first generated error code series in response to said once delayed plurality of data series;
first selection means for selecting a selected one of said once delayed received first error code series and said generated first error code series in response to a selection of said first and second outputs;
second error code generation means for generating a second generated error code series in response to said twice delayed plurality of data series and said selected one of said once delayed received first error code series and said generated first error code series;
second selection means for selecting a selected one of said received second error code series and said generated second error code series in response to a selection of said first and second outputs; and
third delay means for delaying said selected one of said received second error code series and said generated second error code series by said first predetermined period.

2. Apparatus according to claim 1, wherein said first predetermined period is a one-word delay.

3. Apparatus according to claim 2, wherein said plurality of second different predetermined periods are integral multiples of said one-word delay.

4. Apparatus according to claim 1, wherein said first selection means is a random access memory.

5. Apparatus according to claim 1, wherein said second selection means is a random access memory.

6. Apparatus according to claim 1, wherein at least one of said first, second, and third delay means is a random access memory.

7. Apparatus according to claim 1, wherein said second decoder means includes error correction means for correcting said plurality of data signals of said first data sections in response to said error code series of said first data sections.

8. Apparatus according to claim 1, wherein said second decoder means includes error correction means for correcting said plurality of data series included in said second data sections in response to said error code series of said second data sections.

9. Apparatus according to claim 1, wherein said first decoder means includes first deinterleaving means for ordering said respective plurality of data series and first and second error code series of said first data section into said first alignment, and first error correcting means for correcting errors in said respective plurality of data series in response to said respective first and second error code series, and said second decoder means includes second deinterleaving means for reordering said respective plurality of data series and first and second error code series of said second data section into said first alignment, second error correcting means for correcting errors in said respective plurality of data series in response to said respective first and second error code series.

10. Method for editing PCM signals by reproducing a plurality of first data sections from a first recording medium and recording a plurality of second data sections on a second recording medium, each of said first and second data sections including a respective plurality of data series and respective first and second error code series, said method comprising the steps of:

reproducing one of said first data sections from said first recording medium;

decoding said reproduced first data section into its respective plurality of data series ordered in a first alignment and first and second error code series and producing the same as a first output;

reproducing from said second recording medium a second data section composed of a respective plurality of data series and first and second error code series ordered in a second alignment;

decoding said reproduced second data section to reorder its respective plurality of data series and first and second error code series from said second alignment into said first alignment, and producing the same as a second output;

selecting one of said first and second outputs as a third output including received first and second error code series;

encoding said third output to generate first and second generated error code series, to reorder said plurality of data series and selected first and second error code series into said second alignment; and recording the same onto said second recording medium;

said step of encoding including delaying once said plurality of data series and said received first error code series of said third output by a first predetermined period from said received second error code series;

delaying twice said once delayed plurality of data series with respect to each other by a plurality of second different predetermined periods, generating a generated first error code series in response to said once delayed plurality of data series;

selecting a selected one of said once delayed first error code series and said generated first error code series in response to a selection of said first or second outputs;

generating a generated second error code series in response to said twice delayed plurality of data series and said selected one of said once delayed first error code series and said generated first error code series;

selecting a selected one of said received second error code series and said generated second error code series in response to a selection of said first and second outputs; and delaying said selected one of said received second error code series and said generated second error code series by said first predetermined period.

* * * * *